(12) United States Patent
Salmisuo

(10) Patent No.: US 6,830,654 B1
(45) Date of Patent: Dec. 14, 2004

(54) METHOD AND DEVICE FOR TREATING WATER FOR EVAPORATION

(75) Inventor: Mauri Salmisuo, Tuusula (FI)

(73) Assignee: Steris Europe Inc Suomen Sivuliike, Tuusula (FI)

( * ) Notice: Subject to any disclaimer, the term of this patent is extended or adjusted under 35 U.S.C. 154(b) by 0 days.

(21) Appl. No.: 09/831,213

(22) PCT Filed: Nov. 8, 1999

(86) PCT No.: PCT/FI99/00928

§ 371 (c)(1),
(2), (4) Date: May 3, 2001

(87) PCT Pub. No.: WO00/27494

PCT Pub. Date: May 18, 2000

(30) Foreign Application Priority Data

Nov. 9, 1998 (FI) .................................................. 982428

(51) Int. Cl.⁷ .............................. B01D 1/22; C02F 1/20
(52) U.S. Cl. ....................... 159/49; 159/13.2; 159/27.1; 159/43.1; 159/48.1; 159/DIG. 2; 95/241; 96/188
(58) Field of Search ........................ 159/48.1, 49, 13.2, 159/27.1, DIG. 2, 43.1; 96/155, 188–191, 203; 95/241; 203/10, 89, 90, 40; 202/197, 236

(56) References Cited

U.S. PATENT DOCUMENTS

| 3,332,469 A | | 7/1967 | Rosenblad | |
| 3,849,232 A | * | 11/1974 | Kebbler et al. | 203/89 |
| 4,683,025 A | | 7/1987 | Flores | 159/2.1 |
| 4,698,136 A | | 10/1987 | El-Allawy | 203/11 |
| 4,816,044 A | | 3/1989 | Weisert et al. | 55/164 |
| 4,946,559 A | | 8/1990 | Kroneld et al. | 203/4 |
| 4,981,555 A | * | 1/1991 | Hohmann et al. | 202/236 |
| 5,201,366 A | | 4/1993 | Blangetti et al. | 165/112 |
| 5,232,085 A | * | 8/1993 | Hayashi et al. | 202/197 |
| 5,246,541 A | * | 9/1993 | Ryham | 159/49 |
| 5,770,020 A | * | 6/1998 | Koistinen et al. | 159/43.1 |
| 5,930,998 A | | 8/1999 | Blangetti et al. | 60/646 |
| 6,068,730 A | * | 5/2000 | Ramm-Schmidt et al. | 159/43.1 |
| 6,338,774 B1 | * | 1/2002 | Lehman | 159/43.1 |

FOREIGN PATENT DOCUMENTS

| EP | 0 167 647 A2 | 1/1996 |
| FI | 77 380 | 1/1967 |

* cited by examiner

Primary Examiner—Virginia Manoharan
(74) Attorney, Agent, or Firm—Fay, Sharpe, Fagan, Minnich & McKee, LLP

(57) ABSTRACT

In the production of water vapor, particularly in the production of especially clean water vapor, dissolved gases, mainly atmospheric gases, are removed from feed water (2). The feed water is sprayed by a spray nozzle (3) mounted in a hemispherical chamber (1) in a spray pattern which matches an area of an upper end (4) of an arrangement of vertical feed tubes of a falling film evaporator. The dissolved gases are liberated quickly from the sprayed droplets and removed through outlets (5) in the hemispherical chamber. The sprayed droplets collect at the upper ends of the vertical evaporation channels and are distributed evenly thereamong before atmospheric gases can be redissolved.

4 Claims, 2 Drawing Sheets

METHOD AND DEVICE FOR TREATING WATER FOR EVAPORATION

FIELD OF THE INVENTION

The invention relates to the production of clean vapour. In particular, the invention relates to the removal of dissolved gases from the feed-water when using a falling film evaporator.

BACKGROUND OF THE INVENTION

When producing especially clean water vapour, particularly for sterilisation purposes, the feed-water to be evaporated has to be purified of the gases dissolved therein, among other things, to maximise the concentration of the vapour that is generated and, consequently, the condensation heat, and to minimise the corrosive effect. The gases dissolved in the feed-water are mainly atmospheric gases nitrogen, oxygen, carbon dioxide and argon. The solubility of the gases in the water is at the lowest near the boiling point of the liquid.

According to a commonly used standard, for example, the vapour may not contain more than 3.5% non-condensable gases. To remove the dissolved gases, pre-degassing chambers where the heated water has stayed in the gas space for such a long time that the gases have had time to bubble out, as is described in Finnish patent 77 380, have been used in the water feed line.

A falling film evaporator comprises usually a vertical tube bundle, the heating medium, like vapour, a heat transfer fluid or a flue gas being located on the outside. The liquid to be evaporated is fed from above and it flows as a film along the inner walls of the tubes, partly evaporating. The vapour that was generated flows downwards together with the liquid film and is separated from the non-evaporated liquid in the lower part of the evaporator.

Usually, the main problem with the falling film evaporator is the spreading of the liquid into an even film into the tubes. Often a perforated plate arrangement disposed above the smoothed tube end plane is employed. Other solutions are individual distributors or nozzles at the tube ends.

For the degassing of liquids, solutions are known wherein the hot liquid is broken into a fine spray to make the gas bubbles that are generated separate effectively from the liquid phase as a result of a large liquid-gas interface and a short way of travel. The method is used for the degassing of steam boiler water, as disclosed in U.S. Pat. No. 5,201,366, for example, and for the stripping of volatile substances from a liquid phase, as disclosed in publication EP-A 167 647. Besides, negative pressure is often used in the space into which the liquid phase is sprayed.

An apparatus for the removal of gases from water to be used as surgical rinse water is known from U.S. Pat. No. 4,816,044. The apparatus comprises a degassing chamber and the feed-water is sprayed into the upper part thereof. The gases are removed through a pump arrangement generating a slightly negative pressure in the gas space of the degassing chamber.

Methods and apparatuses for distributing feed-water evenly to the inlet of the evaporator channel assembly of an evaporator by using spray nozzles are known from U.S. Pat. Nos. 3,332,469 and 4,683,025.

DISCLOSURE OF THE INVENTION

The method according to claim 1 has now been invented for distributing feed-water effectively to the beginning of the heat-transfer surfaces of a falling film evaporator by removing the gases dissolved in the water and preventing them from re-dissolving at the same time. Another object of the invention is the device according to claim 2 which makes it possible, in a falling film evaporator, in the same operation, to remove the gases from the feed-water and to distribute it evenly into the tube bundle of the evaporator. The apparatus comprises an evaporator top and at least one spraying device arranged therein. In this case, the spraying device is a nozzle, a mist sprayer or a similar device for creating a spray of liquid of a given shape.

The hit pattern of the spraying device or devices is dimensioned in such a way that when water is fed through the device, the water is evenly distributed as droplets over the entire tube end plane under the top. Besides, the spray of droplets results in a large gas-liquid interface. Owing to the fact that the liquid discharged from the spraying device is heated, the gases dissolved in the liquid separate very quickly from the liquid phase at the same time as part of the liquid evaporates. Because the liquid phase distributed as droplets reaches the evaporator channel assembly in a very short time, no gases re-dissolve in the phase before the evaporation starts, as could happen in devices according to the state of the art, wherein the separation of gases was carried out, for example, in a separate chamber.

In addition to the spraying device, the evaporator top comprises an outlet or outlets for removal of the gases. Part of the vapour that was generated in the discharging phase acts as to a carrier in the outflow.

The distribution of the liquid into the evaporator channel assembly can also be affected by arranging a perforated trough above the ends of the evaporator tubes, wherein the water remains as a thin layer before flowing into the evaporator tubes. Dissolved gases can also separate from the thin layer.

DETAILED DESCRIPTION

Figure 1:
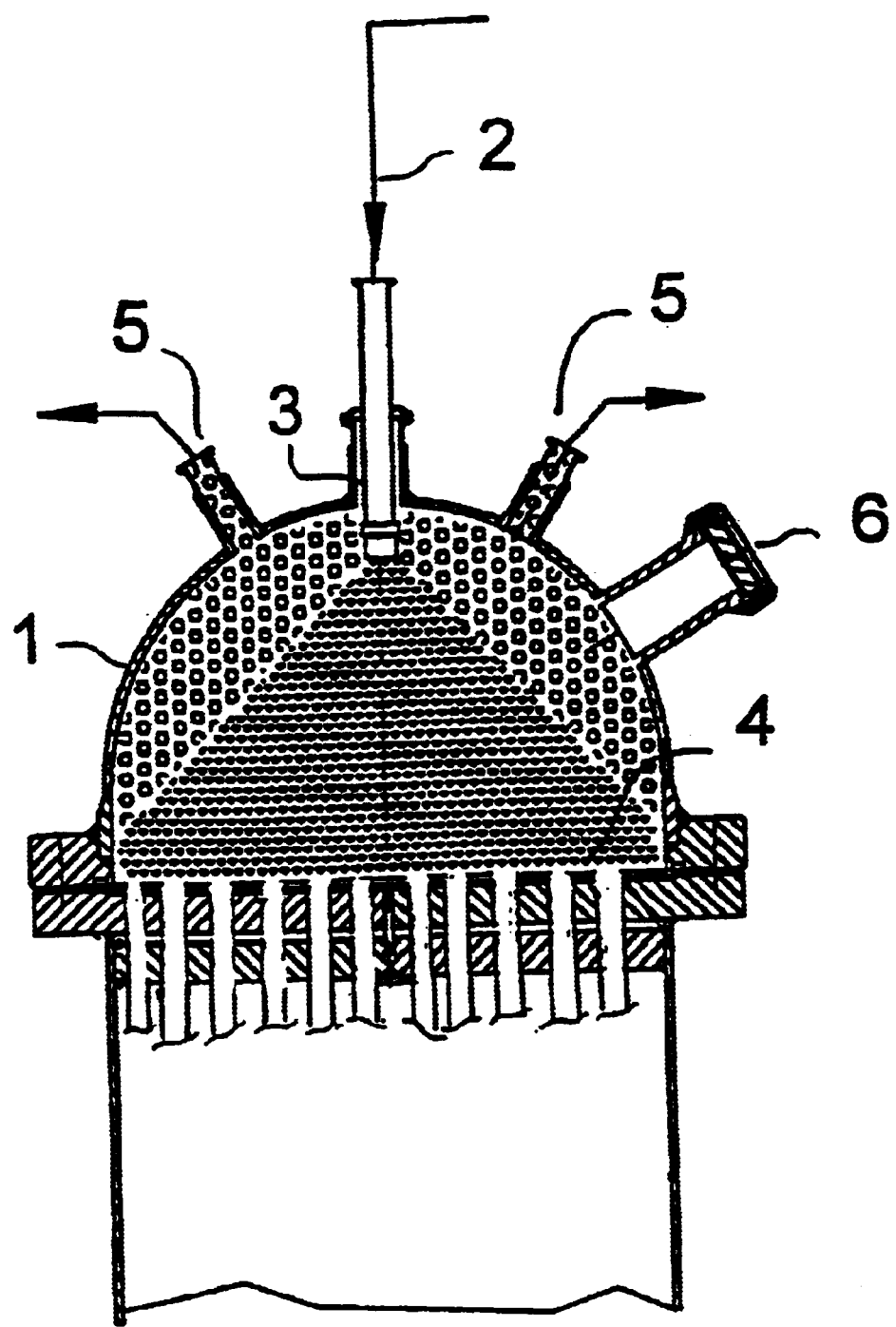
FIG. 1 is a sectional side view of the apparatus according to the invention.

The invention will be described in more detail below, with reference to the accompanying drawing. 1 is a dome-shaped top of a falling film evaporator. The evaporator resembles a tube and shell heat exchanger placed in a vertical position. The feed-water is delivered through line 2 where it can be in a pre-heated state of, for example, 120° C. In line 2, the pressure is preferably about 0.3 to about 6 bar higher than the pressure of the clean vapour to be produced.

The nozzle 3 is selected to provide, in the pressure range used, a hit pattern that substantially corresponds to the shape and size of the tube end plane 4. Suitable nozzles meeting the pressure and temperature requirements are commercially available. In this embodiment, the nozzle is placed in a symmetrically perpendicular position above the tube end plane but it can also be disposed in other ways. Further, more than one spraying device can be employed in order to achieve an even hit pattern. When the heated water is discharged from the nozzle 3 as a spray of droplets, the gases dissolved in the water separate quickly from the droplets and leave through the outlets 5 together with a small quantity of carrier vapour. The degassed droplets of water are distributed evenly into the evaporator tube assembly, and, in contrast to conventional evaporators, a perforated plate or another kind of distributing plate is not necessarily needed above the tube end plant 4. The water reaches the tube ends in a very short time, as a result of which the transfer of heat from the tube wall to the water starts practically immediately.

The distance between the nozzle 3 and the tube end plane 4 is preferably about half the diameter of the plane 4. The apparatus can be provided with a sight glass 6.

Preferably, the separated gases and the carrier steam are led into a heat exchanger where the thermal energy thereof is utilised for preheating the feed-water.

Figure 2:
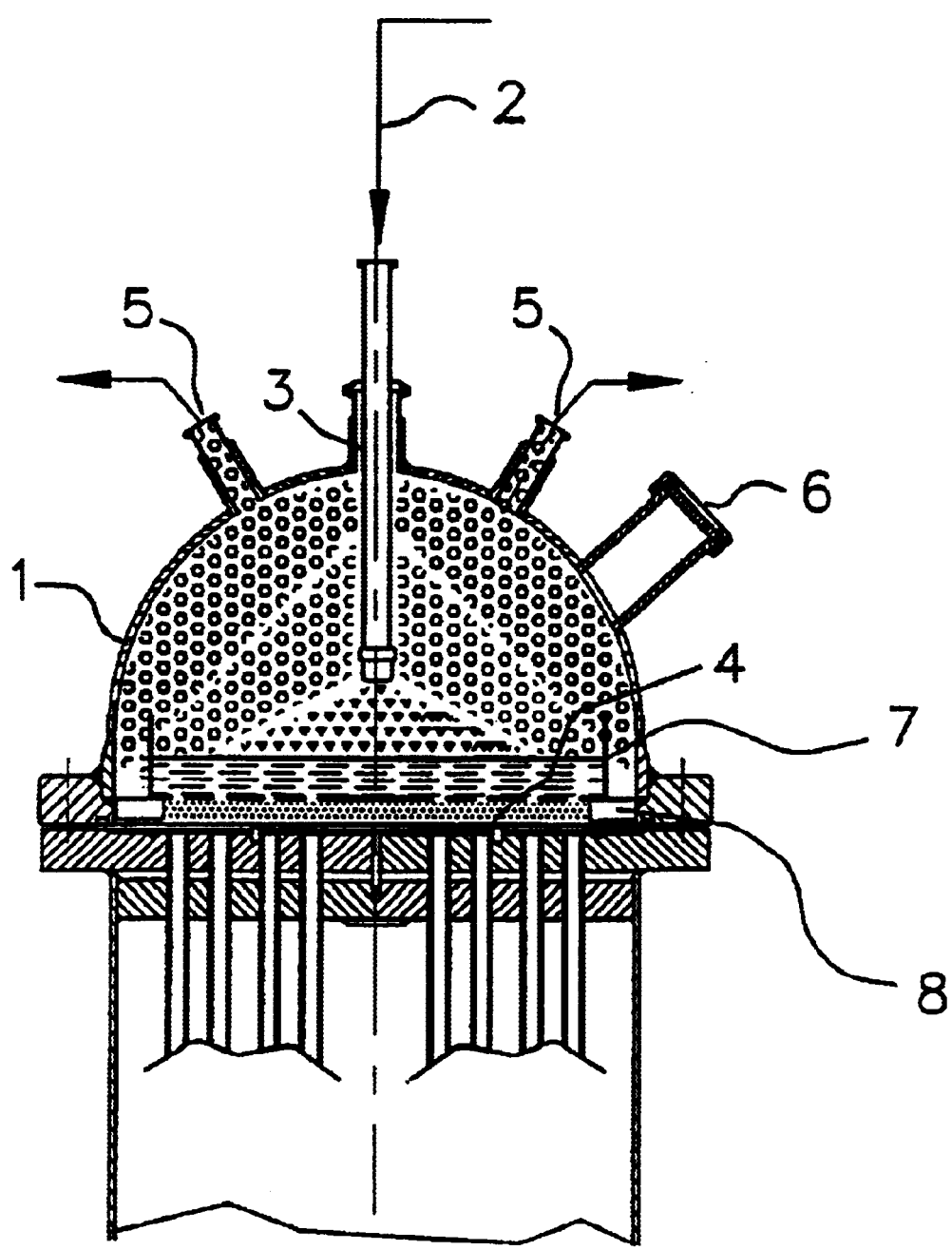
FIG. 2 is a sectional side view of another embodiment of the apparatus according to the invention.

In the embodiment shown in FIG. 2, the apparatus is further provided with a trough 7 that has a perforated bottom and that is arranged above the tube end plane 4 by means of a spacer 8. In this embodiment, a thin layer of water, from which gases still can separate before the water moves to the ends of the evaporator tubes through the bottom holes of the trough, accumulates in the trough 7.

What is claimed is:

1. A method of feeding water to heat transfer surfaces of a falling film evaporator having vertical evaporation channels having upper and lower ends, the method comprising:

spraying drops of water with absorbed atmospheric gases to distribute the water over the upper ends of the vertical evaporation channels of the falling film evaporator;

simultaneously with the spraying, (1) separating the atmospheric gases from the water and (2) discharging the separated atmospheric gases such that the atmospheric gases are removed from the water and the water is distributed over the upper ends of the vertical evaporation channels;

evaporating the water from which the atmospheric gases have been removed in the vertical evaporation channels to generate water vapor with reduced atmospheric gas contamination; and, discharging the water vapor with reduced atmospheric gas contamination from the lower ends of the vertical evaporation channels separately from the separated gases, whereby re-dissolution of the separated gases is prevented.

2. The method as defined in claim 1 further including:

collecting the sprayed droplets into a layer of water above the upper ends of the vertical evaporation channels;

separating additional atmospheric gases from the water layer;

feeding water from the water layer into the upper ends of the vertical evaporation channels.

3. An apparatus for removing dissolved atmospheric gases from water, the apparatus comprising:

a falling film evaporator which includes a plurality of vertical evaporating channels, the vertical evaporating channels having upper ends arranged in an evaporator channel upper end arrangement for receiving water to be vaporized, product vapor exiting from a lower end of the evaporator channels;

a chamber covering the evaporator channels upper end arrangement;

a perforated plate mounted in the chamber above and separated from the evaporator channels upper end arrangement;

at least one spraying device disposed in the chamber to break the water into a spray of droplets, the spray of droplets being sprayed onto the plate, the water passing through perforations in the plate to the evaporator channel upper ends; and at least one dissolved gas outlet from the chamber for removal of the atmospheric gases separated from the water droplets during spraying before the water droplets enter the evaporating channels, such that the product vapor has a lower concentration of atmospheric gases than the water.

4. The apparatus as set forth in claim 3 wherein the vertical evaporating channels upper end arrangement is confined to a circular area and the chamber mounted to the vertical evaporating channels upper end arrangement is hemispherical.

* * * * *